(12) United States Patent
Ueda et al.

(10) Patent No.: US 10,351,354 B2
(45) Date of Patent: Jul. 16, 2019

(54) LIFTING FACILITY AND CONVEYANCE SYSTEM

(71) Applicant: DAIFUKU CO., LTD., Osaka-shi, Osaka (JP)

(72) Inventors: Kazuo Ueda, Osaka (JP); Kiyotoku Sone, Osaka (JP); Jun Kimura, Osaka (JP)

(73) Assignee: DAIFUKU CO., LTD., Osaka-shi, Osaka (JP)

( * ) Notice: Subject to any disclaimer, the term of this patent is extended or adjusted under 35 U.S.C. 154(b) by 0 days.

(21) Appl. No.: 15/752,710

(22) PCT Filed: Aug. 9, 2016

(86) PCT No.: PCT/JP2016/073372
§ 371 (c)(1),
(2) Date: Feb. 14, 2018

(87) PCT Pub. No.: WO2017/038400
PCT Pub. Date: Mar. 9, 2017

(65) Prior Publication Data
US 2018/0257874 A1 Sep. 13, 2018

(30) Foreign Application Priority Data

Sep. 1, 2015 (JP) .................................. 2015-171610

(51) Int. Cl.
*B65G 47/61* (2006.01)
*F26B 15/12* (2006.01)
(Continued)

(52) U.S. Cl.
CPC .............. *B65G 47/61* (2013.01); *F26B 15/12* (2013.01); *F26B 15/14* (2013.01); *F26B 25/003* (2013.01)

(58) Field of Classification Search
CPC ........... B65G 47/61; F26B 15/12; F26B 15/14
(Continued)

(56) References Cited

U.S. PATENT DOCUMENTS 3,854,054 A 12/1974 Conn, Jr.
4,662,925 A * 5/1987 Thimons ............. C03B 23/0302
294/65

(Continued)

FOREIGN PATENT DOCUMENTS

CN 201702094 U 1/2011
CN 102116835 A 7/2011
(Continued)

OTHER PUBLICATIONS

International Search Report from corresponding International Patent Application No. PCT/JP2016/073372, dated Sep. 20, 2016.
(Continued)

*Primary Examiner* — Douglas A Hess
(74) *Attorney, Agent, or Firm* — Kusner & Jaffe (57) ABSTRACT

A lifting facility for a workpiece is provided in a drying furnace for drying the workpiece, and comprises: a drop lift that conveys the workpiece so as to raise and lower the workpiece between one of a carrying-in position at which the workpiece is carried in the drying furnace and a carrying-out position at which the workpiece is carried out from the drying furnace and a high-temperature zone which is formed above the carrying-in position and the carrying-out position and in which the workpiece is dried; and a strut that supports the drop lift so as to raise and lower the drop lift. The strut is extended to the high-temperature zone in the drying furnace.

4 Claims, 8 Drawing Sheets

(51) Int. Cl.
*F26B 15/14* (2006.01)
*F26B 25/00* (2006.01)

(58) Field of Classification Search
USPC .......... 198/464.3; 414/331.04; 432/121, 123
See application file for complete search history.

(56) References Cited

U.S. PATENT DOCUMENTS

| | | | | |
|---|---|---|---|---|
| 4,944,383 A * | 7/1990 | Petrachkoff | ........... | B21B 39/004 |
| | | | | 198/468.6 |
| 5,473,978 A * | 12/1995 | Colombo | ............. | B65G 17/123 |
| | | | | 198/347.1 |
| 5,922,230 A * | 7/1999 | Yokota | ................... | B23K 1/008 |
| | | | | 219/388 |
| 6,164,961 A * | 12/2000 | Luscher | ................... | A21B 1/42 |
| | | | | 198/465.1 |
| 6,649,878 B2 * | 11/2003 | Rehm | ................. | B23K 1/0053 |
| | | | | 198/435 |
| 6,851,872 B1 * | 2/2005 | Okubo | ............. | H01L 21/67276 |
| | | | | 118/52 |
| 7,771,193 B2 * | 8/2010 | Katsumata | ........... | C21D 9/0056 |
| | | | | 266/250 |
| 2011/0107858 A1 | 5/2011 | Obikane et al. | | |
| 2014/0083819 A1 | 3/2014 | Robbin | | |

FOREIGN PATENT DOCUMENTS

| | | |
|---|---|---|
| DE | 10 2010 014 489 B3 | 5/2011 |
| EP | 1746065 A1 | 1/2007 |
| EP | 1998130 A2 | 12/2008 |
| EP | 2 375 205 A2 | 10/2011 |
| JP | 7-100425 A | 4/1995 |
| JP | 2008-178803 A | 8/2008 |
| JP | 2008-232516 A | 10/2008 |
| JP | 2010-70372 A | 4/2010 |
| JP | 2010-159126 A | 7/2010 |
| WO | WO-02/28720 A1 | 4/2002 |

OTHER PUBLICATIONS

Office Action issued in corresponding Chinese Patent Application No. 201680046935.0 dated Apr. 16, 2019.

* cited by examiner

LIFTING FACILITY AND CONVEYANCE SYSTEM

FIELD OF THE INVENTION

The present invention relates to a workpiece lifting facility and a conveyance system that are provided in a drying furnace for drying workpieces.

BACKGROUND OF THE INVENTION

As described in JPH7-100425 ("Patent literature 1"), drying furnaces for drying workpieces in the related art include a flat furnace that is substantially flat over a conveyance path from a workpiece carrying-in port to a workpiece carrying-out port and a mountain-shaped furnace that has an intermediate conveyance path located at a high position relative to a workpiece carrying-in port and a workpiece carrying-out port.

However, a flat furnace is substantially flat over the conveyance path and thus hot air in the drying furnace is likely to be released out of the furnace from the carrying-in port and the carrying-out port (a large heat loss from the carrying-in port and the carrying-out port), disadvantageously leading to low thermal efficiency in the drying furnace.

In a mountain-shaped furnace, an intermediate conveyance path is located at a high position relative to a workpiece carrying-in port and a workpiece carrying-out port and thus hot air in the drying furnace is less prone to being released out of the furnace from the carrying-in port and the carrying-out port. However, an inclined part needs to be provided between an intermediate part and the carrying-in port and the carrying-out port. This extends the inclined part longer than that of a flat furnace, disadvantageously upsizing the overall drying furnace.

Thus, as described in JP2008-178803 ("Patent literature 2"), a drying furnace has been developed in which a conveyance path in an intermediate part of the drying furnace is located at a high position relative to a workpiece carrying-in port and a workpiece carrying-out port and a lifting facility raises and lowers workpieces to the conveyance path.

The lifting facility used for the drying furnace of Patent literature 2 is configured such that a drop lifter in a drying booth raises and lowers a drying palette truck to an upper conveyance rail while the palette truck carries a conveyance skid for conveying an automotive body of a coating line on a roller conveyor.

However, the lifting facility of Patent literature 2 includes a strut provided outside the drying booth, the strut supporting the drop lifter (lifting apparatus) so as to raise and lower the drop lifter. Thus, a part for moving the drop lifter (lifting apparatus) in the drying booth requires a slit (clearance). This easily releases air in a high-temperature zone of the drying furnace to the outside from the slit (clearance) of the drying booth (a large heat loss in the drying booth), disadvantageously leading to low thermal efficiency in the drying furnace.

Thus, an object of the present invention is to provide a lifting facility and a conveyance system that can improve thermal efficiency in a drying furnace by preventing air in a high-temperature zone of the drying furnace from leaking to the outside.

SUMMARY OF THE INVENTION

A solution to the problem to be solved by the present invention will be described below.

A lifting facility according to a first aspect of the present invention is a lifting facility provided for a workpiece in a drying furnace for drying the workpiece, the lifting facility including: a lifting apparatus that conveys the workpiece so as to raise and lower the workpiece between one of a carrying-in position where the workpiece is conveyed into the drying furnace and a carrying-out position where the workpiece is conveyed from the drying furnace and a high-temperature zone that is formed above the carrying-in position and the carrying-out position and allows drying of the workpiece; and a strut that supports the lifting apparatus so as to raise and lower the lifting apparatus, the strut being extended to the high-temperature zone in the drying furnace.

In this configuration, the lifting apparatus is operated by the strut extended to the high-temperature zone in the drying furnace.

In the lifting facility according to the first aspect, an invention according to a second aspect includes a detector that detects the upper limit position of the lifting apparatus, the detector including: a lifting part that is raised or lowered when one end of the lifting part comes into contact with the lifting apparatus in the high-temperature zone; and a detection part that detects the position of the other end of the raised or lowered lifting part outside the drying furnace.

In this configuration, the upper limit position of the lifting apparatus is detected through the detection of the position of the lifting part raised and lowered in contact with the lifting apparatus in the high-temperature zone. In other words, the upper limit position of the lifting apparatus is indirectly detected through the lifting part.

In the lifting facility according to the first aspect or the second aspect, an invention according to a third aspect is configured such that the workpiece is conveyed to the carrying-in position while being supported by a workpiece support member, the lifting apparatus includes a first stop apparatus that stops the workpiece at the carrying-in position, and the first stop apparatus includes a mechanical locking mechanism that locks the workpiece support member so as to operate the workpiece support member in the high-temperature zone.

In this configuration, the workpiece is stopped at the carrying-in position by the mechanical locking mechanism that can be operated in the high-temperature zone.

In the lifting facility according to the third aspect, an invention according to a fourth aspect is configured such that the first stop apparatus includes: a locking part that locks the workpiece support member; a contact part that comes into contact with the locking part and operates the locking part so as to unlock the workpiece support member locked by the locking part; and a regulating part that regulates the operation of the locking part.

In this configuration, the workpiece is stopped by locking the workpiece support member by means of the locking part and the workpiece is released by bringing the contact part into contact with the locking part.

A conveyance system according to a fifth aspect is a conveyance system provided for a workpiece in a drying furnace for drying the workpiece, the conveyance system including: a first lifting facility that is formed above a carrying-in position where the workpiece is carried in the drying furnace, the first lifting facility raising the workpiece to a high-temperature zone for drying the workpiece; a conveyance facility that conveys, in the high-temperature zone, the workpiece raised by the first lifting facility; and a second lifting facility that lowers the workpiece conveyed by the conveyance facility, to a carrying-out position where the workpiece is carried out from the drying furnace, wherein each of the first lifting facility and the second lifting facility includes: a lifting apparatus that raises and lowers the workpiece; and a strut that supports the lifting apparatus so as to raise and lower the workpiece, the strut being extended to the high-temperature zone in the drying furnace.

In this configuration, the lifting apparatus is operated by the strut extended to the high-temperature zone in the drying furnace.

In the conveyance system according to the fifth aspect, an invention according to a sixth aspect is configured such that the conveyance facility conveys the workpiece supported by a workpiece support member, and the lifting apparatus of the second lifting facility includes a second stop apparatus that stops the workpiece at a workpiece receiving position where the workpiece is received from the conveyance facility, the second stop apparatus including a mechanical locking mechanism that locks the workpiece support member so as to operate the workpiece support member in the high-temperature zone.

In this configuration, the workpiece is stopped at the workpiece receiving position by the mechanical locking mechanism that can be operated in the high-temperature zone.

According to the lifting facility and the conveyance system of the present invention, the strut that supports the lifting apparatus so as to raise and lower the lifting apparatus is extended to the high-temperature zone in the drying furnace, so that the overall strut is provided in the drying furnace. This eliminates the need for a slit (clearance) in a part where the lifting apparatus is moved in the drying booth, thereby preventing air in the high-temperature zone of the drying furnace from leaking out of the drying furnace (reducing a heat loss in the drying booth) so as to improve the thermal efficiency of the drying furnace.

DETAILED DESCRIPTION OF THE INVENTION

A drying furnace 1 including a conveyance system 10 (lifting facilities 20 and 70) according to the present invention will be first described below.

Figure 1:
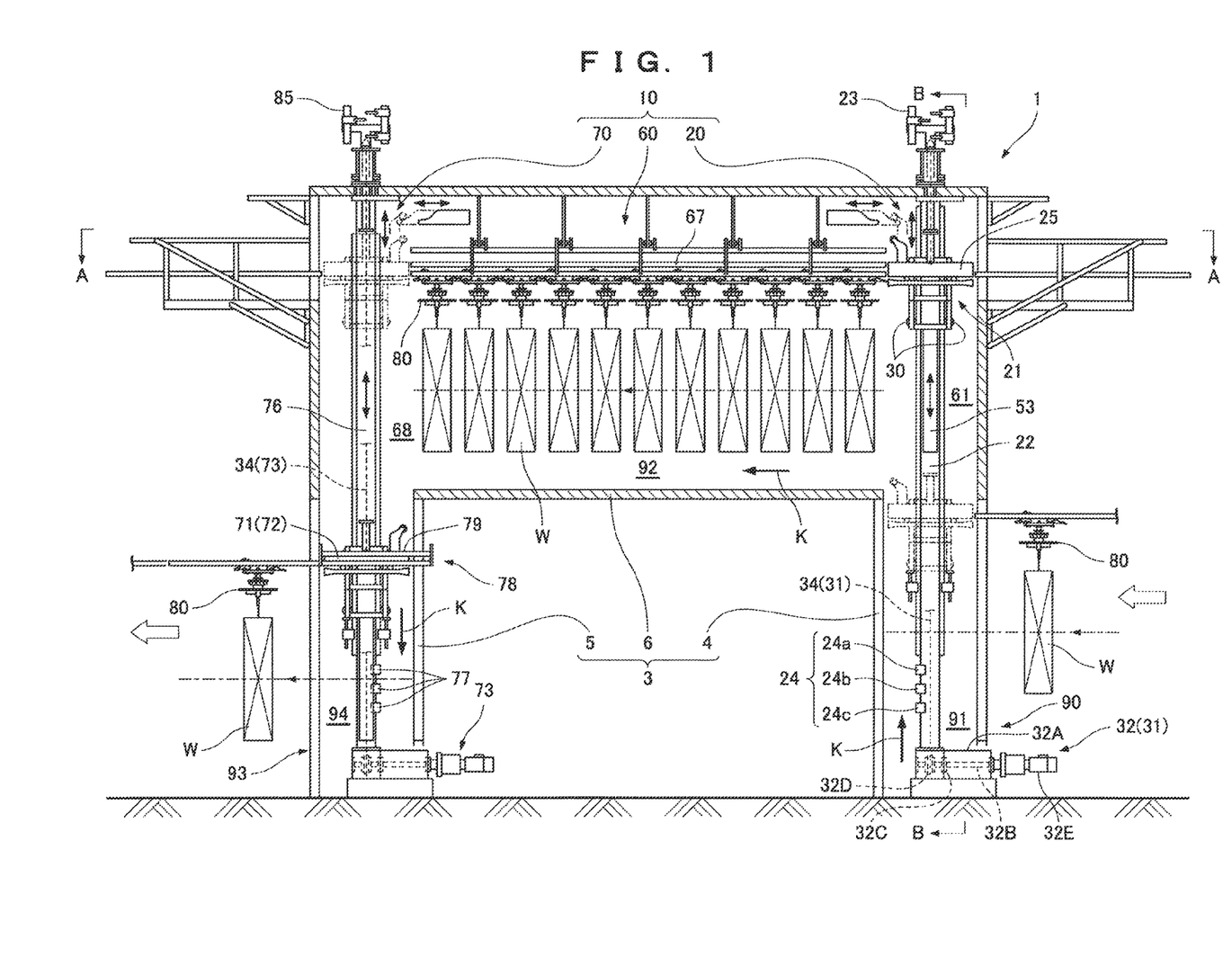
FIG. 1 is a front cross-sectional view showing a drying furnace including a conveyance system (lifting facilities) according to the present invention.
Figure 2:
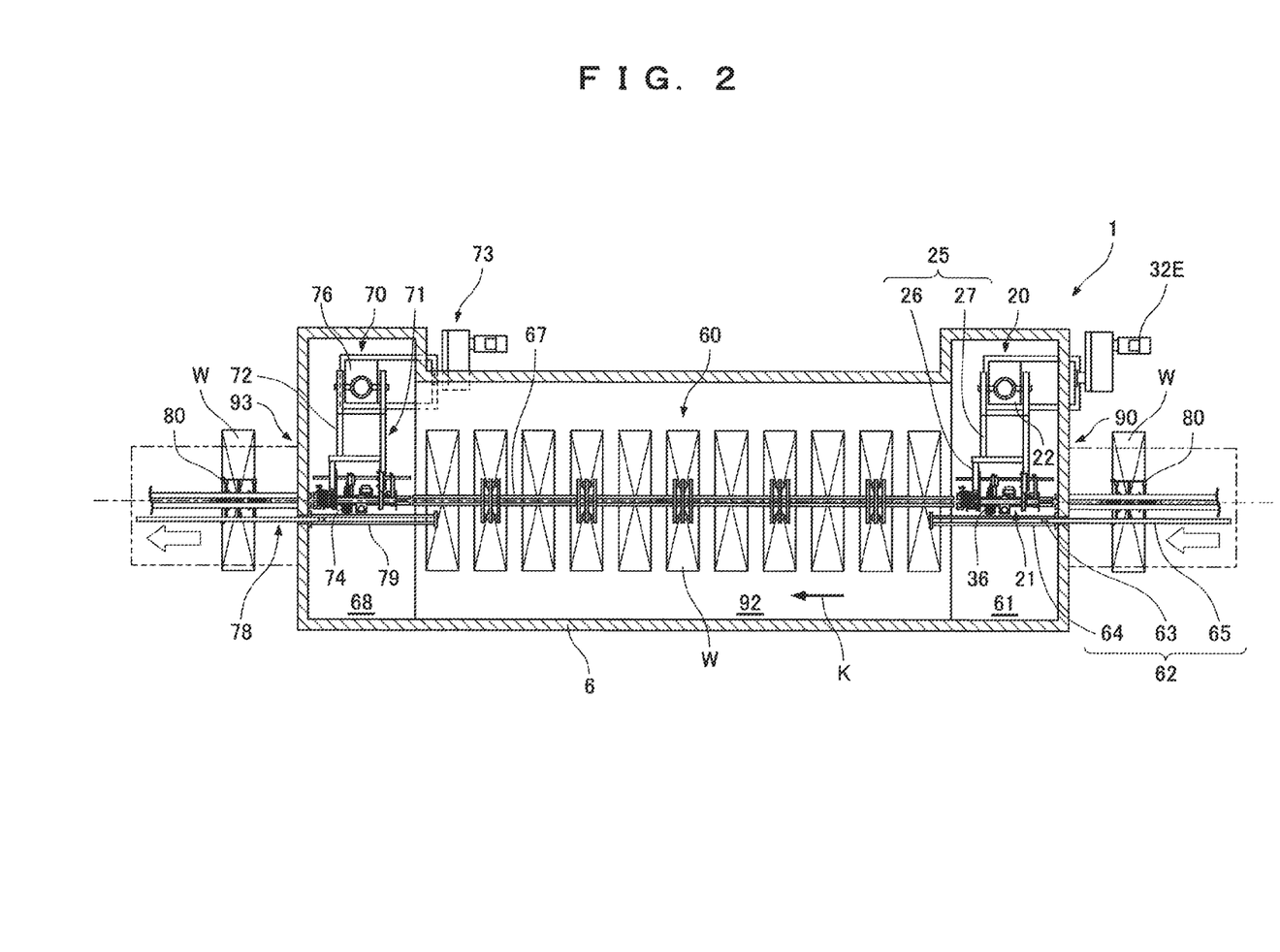
FIG. 2 is a cross-sectional view taken along line A-A of FIG. 1.
Figure 3:
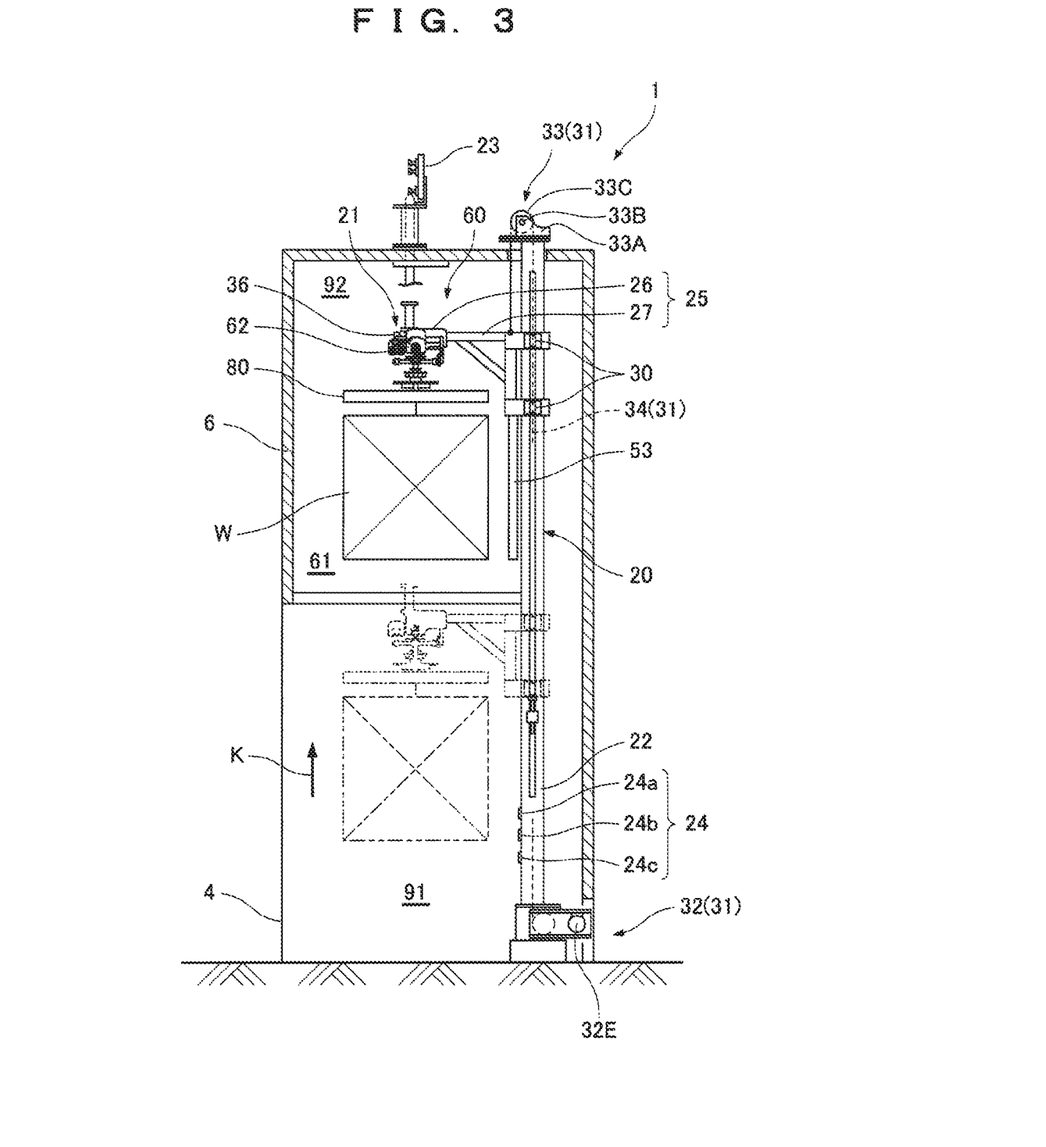
FIG. 3 is a cross-sectional view taken along line B-B of FIG. 1.

As shown in FIGS. 1 to 3, the drying furnace 1 including the conveyance system 10 (lifting facilities 20 and 70) dries workpieces W such as a coated automotive body. The workpiece W to be dried in the drying furnace 1 is supported with the upper end hung from a workpiece support member 80. The workpiece support member 80 has a plurality of guide rollers 81 (FIG. 4) on the workpiece support member 80. The workpiece support member 80 is configured so as to travel with the workpiece W hung from the workpiece support member 80.

The drying furnace 1 is made up of a drying booth 3 that is a housing substantially shaped like a reversed letter U. The drying booth 3 includes a first wall part 4 and a second wall part 5 that are shaped like rectangular solids on both ends of the drying booth 3 and a main unit 6 shaped like a rectangular solid. The first wall part 4, the second wall part 5, and the main unit 6 are hollow parts.

The drying booth 3 has a carrying-in port 90 (carrying-in position 91) that is provided in the lower part of the first wall part 4 such that the workpieces W are conveyed into the drying furnace 1 through the carrying-in port 90. The drying booth 3 has a carrying-out port 93 (carrying-out position 94) that is provided in the lower part of the second wall part 5 such that the workpieces W are conveyed from the drying furnace 1 through the carrying-out port 93. The drying booth 3 has a high-temperature zone 92 for drying the workpieces W, in the main unit 6 disposed on the first wall part 4 and the second wall part 5. In other words, the high-temperature zone 92 is formed above the carrying-in port 90 (carrying-in position 91) and the carrying-out port 93 (carrying-out position 94). The main unit 6 (high-temperature zone 92) is kept at sufficiently high temperatures (e.g., 190° C.) in order to dry the workpieces W. The first wall part 4 and the second wall part 5 are kept in temperature ranges (e.g., a medium temperature range, a medium-low temperature range, and a low temperature range) from the tops to the bottoms of the wall parts.

Moreover, the drying booth 3 has a conveyance path K for conveying the workpieces W hung from the workpiece support members 80. The conveyance path K includes a first path formed between the carrying-in port 90 (carrying-in position 91) and the high-temperature zone 92 in the first wall part 4, a second path formed in the high-temperature zone 92 contained in the main unit 6, and a third path formed between the carrying-out port 93 (carrying-out position 94) and the high-temperature zone 92 in the second wall part 5.

In the drying furnace 1, the workpieces W hung from the workpiece support members 80 are conveyed from the carrying-in port 90 by a carrying facility (not shown), which is provided outside the drying furnace 1, and are delivered at the carrying-in position 91 into the drying furnace 1. The workpieces W delivered at the carrying-in position 91 are raised from the carrying-in position 91 to the high-temperature zone 92 while being hung from the workpiece support members 80. The workpieces W raised to the high-temperature zone 92 are conveyed and dried in the high-temperature zone 92 while being hung from the workpiece support members 80. After that, the dried workpieces W are lowered from the high-temperature zone 92 to the carrying-out position 94, are delivered to a carrying facility (not shown), which is provided outside the drying furnace 1, at the carrying-out position 94, and then are conveyed from the carrying-out port 93.

The conveyance system 10 according to the present invention will be described below.

As shown in FIG. 1, the conveyance system 10 is provided for conveying the workpieces W, which are supported by the workpiece support members 80, along the conveyance path K. The conveyance system 10 is provided along the conveyance path K in the drying furnace 1 (drying booth 3). The conveyance system 10 is mainly composed of the first lifting facility 20 (an example of "lifting facility"), a conveyance facility 60, and a second lifting facility 70 (an example of "lifting facility").

The first lifting facility 20 will be first described below.

The first lifting facility 20 raises the workpiece W from the carrying-in position 91 to the high-temperature zone 92. The first lifting facility 20 is provided from the carrying-in position 91 to the high-temperature zone 92 in the first wall part 4 of the drying booth 3. The first lifting facility 20 receives, at the carrying-in position 91, the workpiece W carried by the carrying facility (not shown) provided outside the drying furnace 1. Subsequently, the first lifting facility 20 raises the received workpiece W to the high-temperature zone 92 while the workpiece W is supported by the workpiece support member 80. The first lifting facility 20 includes a first drop lift 21 (an example of "lifting apparatus"), a first strut 22, a first upper-limit position detector 23 (an example of "detected position"), and a first lower-limit position detector 24.

The first drop lift 21 raises the workpiece W hung from the workpiece support member 80, from the carrying-in position 91 to the high-temperature zone 92. The first drop lift 21 is mainly composed of a first support part 25, a first driving part 31, and a first stop apparatus 36.

The first support part 25 supports the workpiece support member 80 with the workpiece W hung from the workpiece support member 80. The first support part 25 is configured so as to raise and lower the workpiece support member 80 along the first strut 22. As shown in FIGS. 2 and 3, the first support part 25 is mainly composed of a first support member 26 and a first arm member 27.

Figure 4:
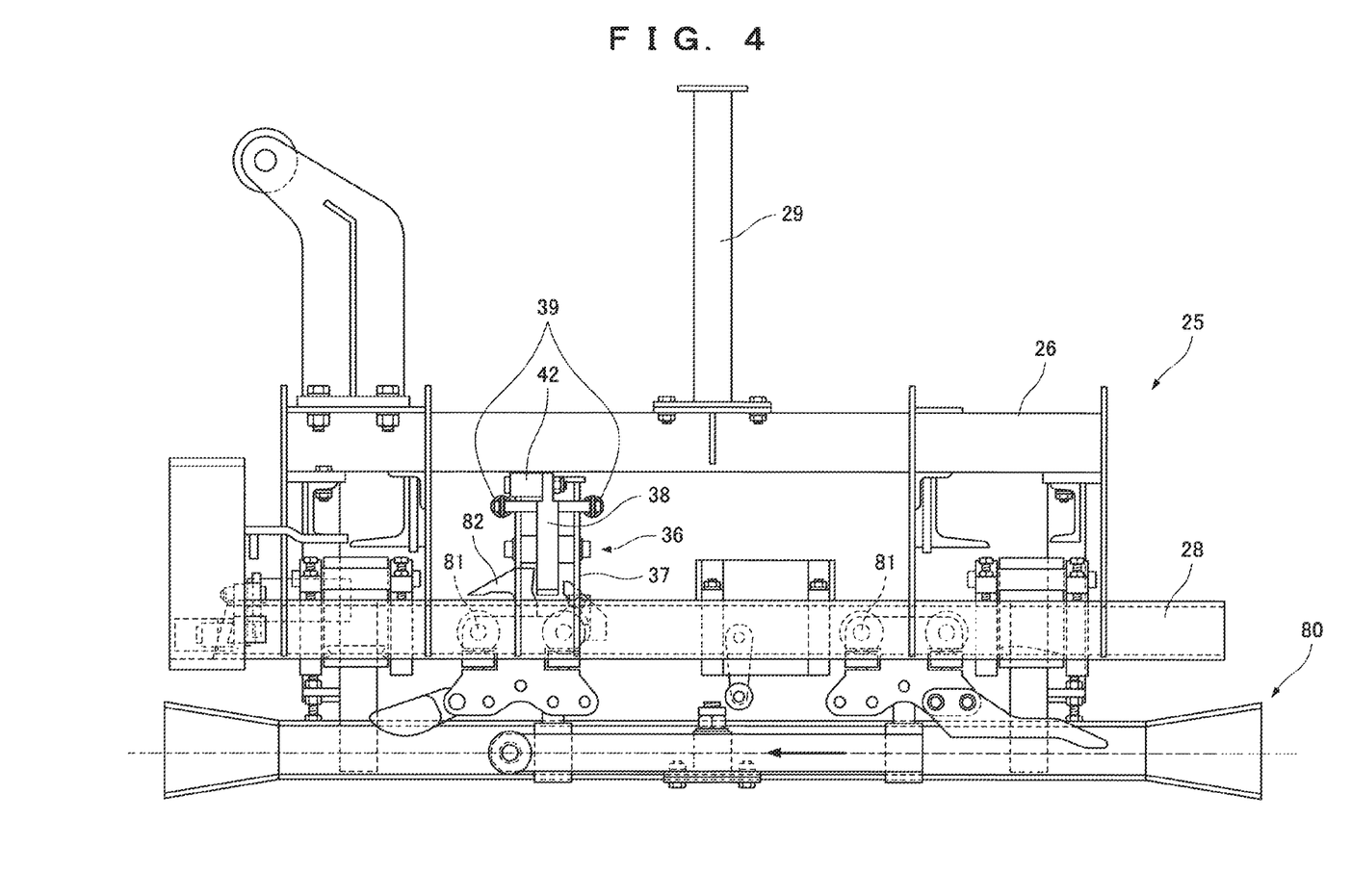
FIG. 4 is a front view of a first drop lift.
Figure 5:
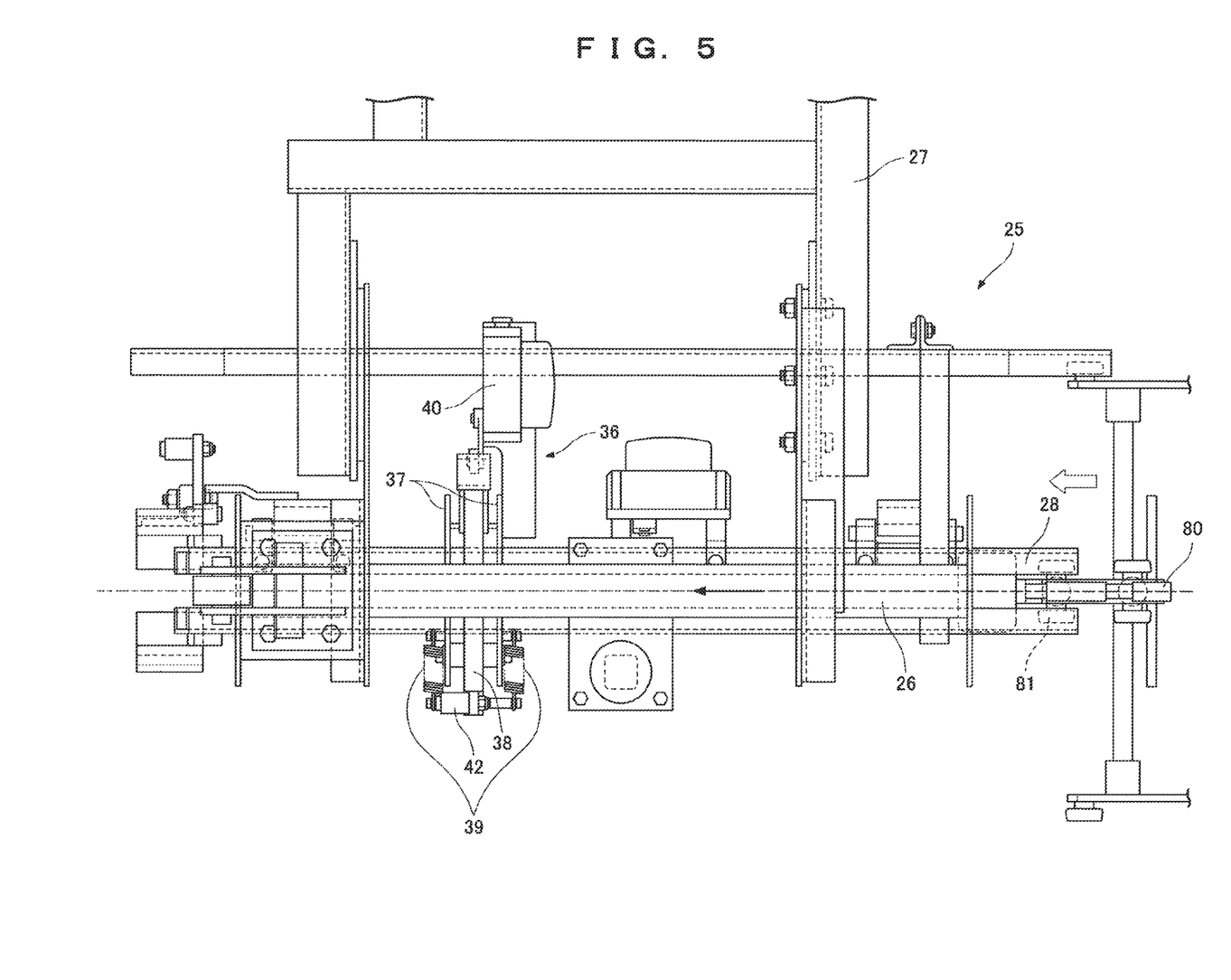
FIG. 5 is a plan view of the first drop lift.

The first support member 26 supports the workpiece support member 80 with the workpiece W hung from the workpiece support member 80. The first support member 26 is elongately formed at the carrying-in port 90 (carrying-in position 91) to extend along the conveyance direction of the workpiece W (in a direction orthogonal to the workpiece W supported by the workpiece support member 80). As shown in FIG. 4, the first support member 26 has a guide rail 28 that is provided under the first support member 26 so as to guide guide rollers 81 of the workpiece support member 80. The first support member 26 supports the workpiece support member 80 via the guide rail 28. The first support member 26 has a contact body 29 on the first support member 26 such that the contact body 29 is in contact with a lifting part 45 of the first upper-limit position detector 23, which will be discussed later. The contact body 29 includes a rod member that is brought into contact with one end (lower end) of a contact member 47 in the lifting part 45 of the first upper-limit position detector 23 when the first drop lift 21 rises. The rod member in contact with the contact member 47 can press the contact member 47 upward.

As shown in FIGS. 1 to 3, the first arm member 27 supports the first support member 26. The first arm member 27 is made up of a member having high heat resistance to high temperatures in the high-temperature zone 92. One end of the first arm member 27 is supported on the first strut 22 so as to be raised and lowered via a lifting chain 34 that rotates in a vertical direction. The first arm member 27 has rollers 30 at parts supported by the first strut 22. The rollers 30 are rotated in response to the rotation of the lifting chain 34 so as to raise and lower the first arm member 27 along the first strut 22. The other end of the first arm member 27 protrudes substantially perpendicularly to the first strut 22 and supports the first support member 26 with the tip end of the first arm member 27. Furthermore, a shield plate 53 for protecting the first lower-limit position detector 24 from heat is provided on the lower end of the first arm member 27.

The first driving part 31 drives the first support part 25 so as to raise and lower the first support part 25. The first driving part 31 raises and lowers the first arm member 27 of the first support part 25 along the first strut 22. The first driving part 31 is mainly composed of a driving unit 32 provided on the lower end of the first strut 22, a driven unit 33 provided on the upper end of the first strut 22, and the lifting chain 34 rotatably looped over the driving unit 32 and the driven unit 33.

As shown in FIG. 1, the driving unit 32 has a rotating shaft 32B penetrating a unit frame 32A that forms the main unit of the driving unit 32. A bearing unit 32C and a sprocket 32D are fit to the rotating shaft 32B. A motor 32E is provided on one end of the rotating shaft 32B. The unit frame 32A (the bearing unit 32C and the sprocket 32D) is provided in the drying furnace 1 (drying booth 3). The motor 32E is provided outside the drying furnace 1 (drying booth 3).

As shown in FIG. 3, in the driven unit 33, the rotating shaft 33B is rotatably supported by the unit frame 33A that forms the main unit of the driven unit 33. The sprocket 33C is fit to the rotating shaft 33B. The driven unit 33 (the unit frame 33A, the rotating shaft 33B, and the sprocket 33C) is provided outside the drying furnace 1 (drying booth 3).

The lifting chain 34 is made up of a member having high heat resistance to high temperatures in the high-temperature zone 92. As shown in FIGS. 1 and 3, the lifting chain 34 is configured in a loop along the first strut 22. One end of the lifting chain 34 is looped over the sprocket 32D of the driving unit 32 and the other end of the lifting chain 34 is looped over the sprocket 33C of the driven unit 33.

As shown in FIGS. 2 to 6, the first stop apparatus 36 is provided for stopping, at the carrying-in position 91, the workpieces W received from the carrying facility (not shown) provided outside the drying furnace 1. The first stop apparatus 36 is provided on the guide rail 28 of the first support part 25. The first stop apparatus 36 is engaged with a protruding part 82 (FIG. 4) that protrudes from the guide rollers 81 of the workpiece support member 80. Thus, the workpiece support member 80 is locked and the workpiece W supported by the workpiece support member 80 is stopped at the carrying-in position 91.

The first stop apparatus 36 is provided in the drying furnace 1 (drying booth 3) and is configured so as to operate in the high-temperature zone 92. Thus, the members of the first stop apparatus 36 are made up of members having high heat resistance to high temperatures in the high-temperature zone 92. The first stop apparatus 36 is mainly composed of a main unit 37, a locking arm 38 (an example of "locking part"), elastic members 39 (an example of "regulating part"), an arm detection switch 40, and a fixed guide 66 (an example of "contact part") provided on a feeder frame 64 of a first feeder 62.

The main unit 37 is a main part of the first stop apparatus 36 and is provided perpendicularly to the guide rail 28 of the first support part 25. The main unit 37 partially holds the guide rail 28 of the first support part 25.

Figure 6A:
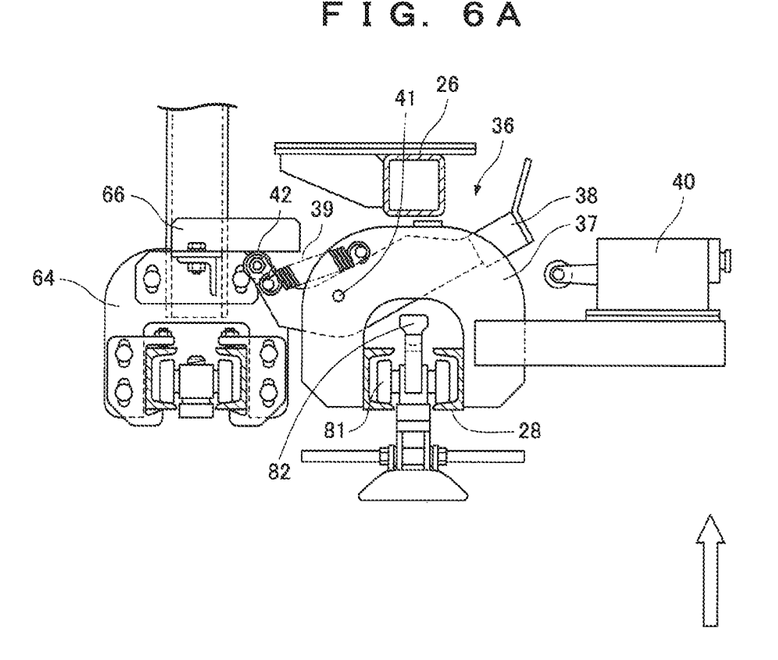
FIG. 6A is a front view of a first stop apparatus when the first drop lift rises to a high-temperature zone.
Figure 6B:
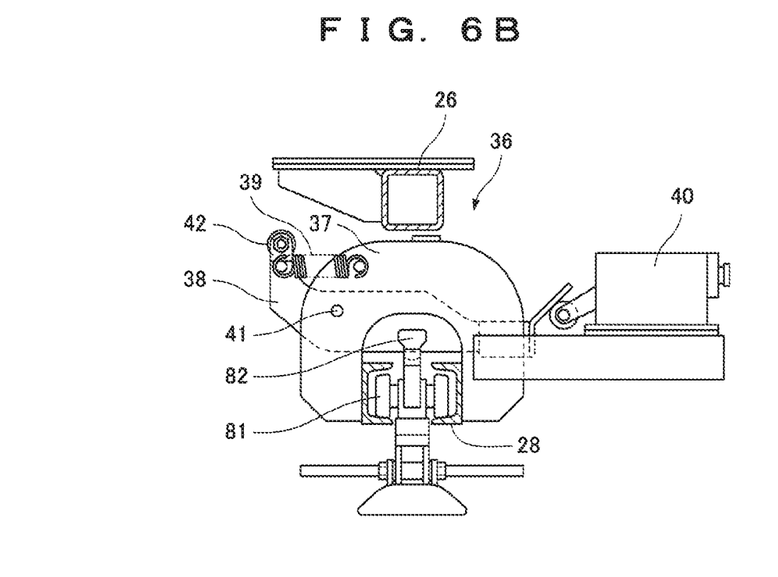
FIG. 6B is a front view of the first stop apparatus when the first drop lift lowers to a carrying-in position.

The locking arm 38 is a part for locking the workpiece support member 80. As shown in FIGS. 6A and 6B, the locking arm 38 is rotatably supported by a first rotating shaft 41 provided in the main unit 37. A contact part 42 on one end of the locking arm 38 comes into contact with the fixed guide 66 and is pressed downward, so that the locking arm 38 rotates about the first rotating shaft 41. In other words, the locking arm 38 is mechanically operated by the contact of the fixed guide 66. In the first stop apparatus 36, the workpiece support member 80 is locked by operating the locking arm 38 in the drying furnace 1 (drying booth 3) including the high-temperature zone 92. This requires a driving source having high heat resistance to high temperatures where the locking arm 38 is operable. However, such a driving source is expensive, increasing the cost of the overall system. Thus, in the first stop apparatus 36, the locking arm 38 for locking the workpiece support member 80 includes a mechanical locking mechanism and can be operated without using a driving source, e.g., an air cylinder. Moreover, the other end of the locking arm 38 comes into contact with the arm detection switch 40.

The elastic members 39 regulate the rotation of the locking arm 38. The elastic member 39 is provided between the main unit 37 and one end of the locking arm 38. The elastic members 39 regulate the locking arm 38 in a direction opposite to the rotation direction (downward direction) of the locking arm 38 when coming into contact with the fixed guide 66. Since the member for regulating the rotation of the locking arm 38 is the elastic member 39, the influence of tar or the like generated in the drying furnace 1 is reduced.

The arm detection switch 40 is provided on the main unit 37. When coming into contact with the other end of the locking arm 38, the arm detection switch 40 detects that the locking arm 38 has locked the protruding part 82 on the guide rollers 81 of the workpiece support member 80.

As shown in FIGS. 1 to 3, the first strut 22 supports the first drop lift 21 so as to raise and lower the first drop lift 21. Specifically, the first strut 22 supports the first arm member 27 of the first support part 25 so as to raise and lower the first arm member 27. The first strut 22 is extended from the carrying-in position 91 to the high-temperature zone 92 in the drying furnace 1 (drying booth 3). In other words, the first strut 22 is provided so as to be covered in the drying furnace 1 (drying booth 3). Thus, the first strut 22 is made up of a member having high heat resistance to high temperatures in the high-temperature zone 92.

Figure 7:
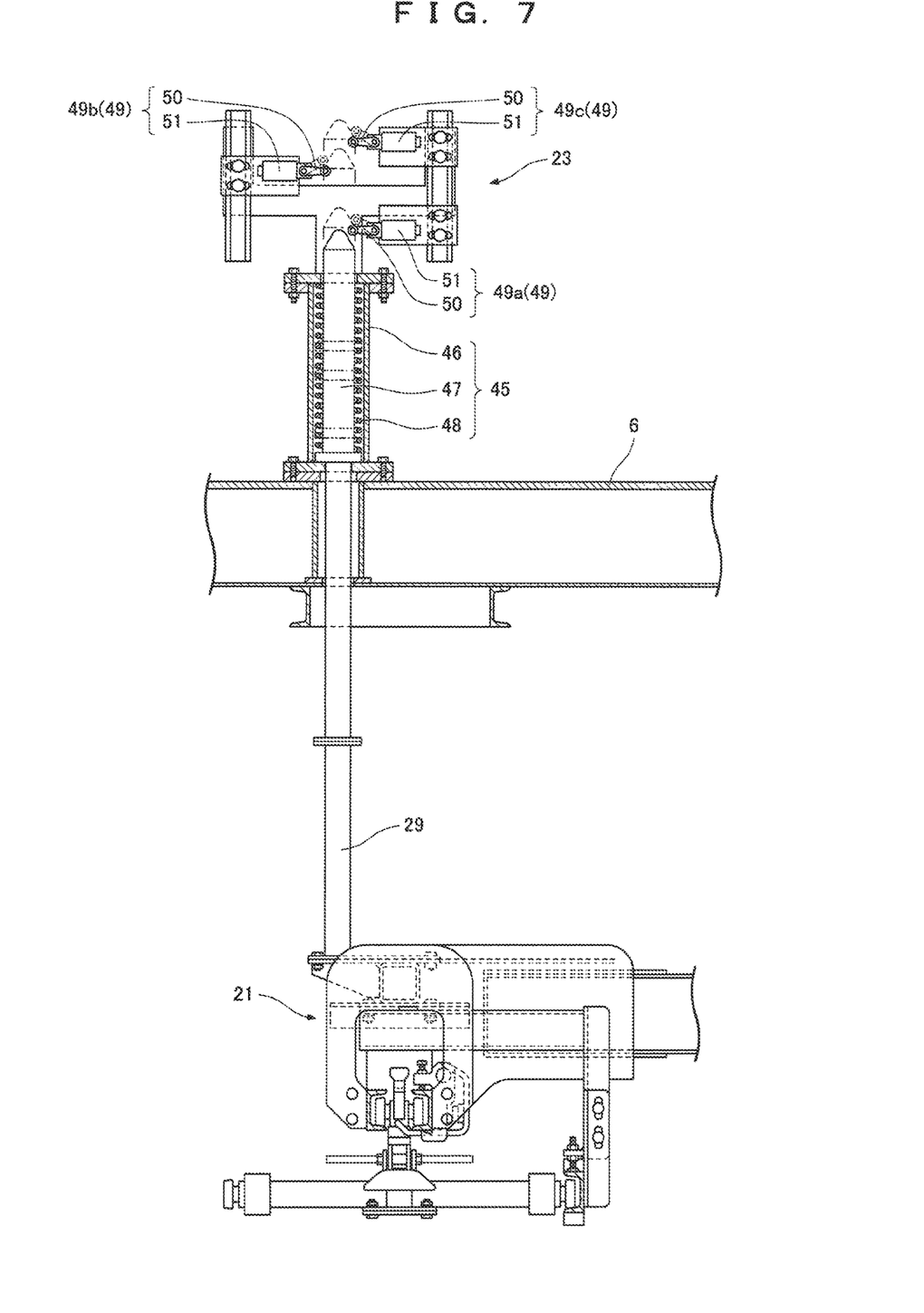
FIG. 7 is a front view of an upper-limit position detector.

As shown in FIGS. 1, 3, and 7, the first upper-limit position detector 23 detects the position (upper limit position) of the first drop lift 21 in the high-temperature zone 92. As shown in FIG. 7, the first upper-limit position detector 23 is mainly composed of the lifting part 45 that is raised or lowered when coming into contact with the first drop lift 21 in the high-temperature zone 92 and a detection part 49 that detects the position of the raised or lowered lifting part 45 outside the drying furnace 1.

Since the first upper-limit position detector 23 detects the position (upper limit position) of the first drop lift 21 in the high-temperature zone 92, the drying furnace 1 (drying booth 3) fundamentally needs to contain a detection part (detector) having high heat resistance to high temperatures where a position can be detected in the high-temperature zone 92. However, such a detection part (detector) is expensive, increasing the cost of the overall system. Thus, the first upper-limit position detector 23 causes the detection part 49 provided outside the drying furnace 1 (drying booth 3) to detect the position of the lifting part 45 raised in contact with the first drop lift 21. This can indirectly detect the position (upper limit position) of the first drop lift 21. Specifically, the lifting part 45 is brought into contact with the first drop lift 21 rising to the high-temperature zone 92, so that the lifting part 45 is raised in synchronization with the rising of the first drop lift 21. Subsequently, the position of the lifting part 45 raised in synchronization with the rising of the first drop lift 21 is detected by the detection part 49 provided outside the drying furnace 1 (drying booth 3). This can indirectly detect the position (upper limit position) of the first drop lift 21 in the high-temperature zone 92 by detecting the position of the raised lifting part 45.

As shown in FIG. 7, the lifting part 45 is mainly composed of a cylindrical member 46, a contact member 47, and an elastic member 48.

The cylindrical member 46 is a tube member that forms the main unit of the lifting part 45. The cylindrical member 46 is inserted into the main unit 6 disposed above the position of the raised and lowered first drop lift 21. The contact member 47 penetrating the elastic member 48 is inserted with the elastic member 48 into the cylindrical member 46.

The contact member 47 is a rod member with one end having an acute angle. One end (lower end) of the contact member 47 is in contact with a contact body 29 of the first drop lift 21 and the other end (upper end) of the contact member 47 is detected by the detection part 49. The contact member 47 is urged downward by the elastic member 48 and is raised when being pressed in contact with the contact body 29 of the first drop lift 21.

The detection part 49 includes a detection switch 50 and a detector 51.

The detection switch 50 is a part brought into contact with the other end (upper end) of the contact member 47 of the lifting part 45. The detection switch 50 is provided at the position of the raised and lowered contact member 47. The detection switch 50 is pressed upward in contact with the contact member 47 so as to be turned on.

The detector 51 is a apparatus for detecting an on state of the detection switch 50. The detector 51 detects an on state of the detection switch 50, allowing transmission of a detection signal to a controller (not shown). The controller detects the rising of the first drop lift 21 to a predetermined position in response to the detection signal from the detector 51.

The detection part 49 includes detection parts 49a, 49b, and 49c. The detection parts 49a, 49b, and 49c are disposed at predetermined positions at predetermined intervals. For example, the detection part 49a is provided at a position where the other end (upper end) of the contact member 47 of the lifting part 45 comes into contact with the detection switch 50 when the first drop lift 21 is raised to a switching position from high-speed traveling to low-speed traveling. Similarly, the detection part 49b is provided at a position where the other end (upper end) of the contact member 47 of the lifting part 45 comes into contact with the detection switch 50 when the first drop lift 21 is raised to a switching position from low-speed traveling to ultralow-speed traveling while the detection part 49c is provided at a position where the other end (upper end) of the contact member 47 of the lifting part 45 comes into contact with the detection switch 50 when the first drop lift 21 is raised to a switching position from ultralow-speed traveling to a stopping state.

As shown in FIGS. 1 and 3, the first lower-limit position detector 24 detects the position (lower limit position) of the first drop lift 21, which is lowered from the high-temperature zone 92 to the carrying-in position 91, at the carrying-in position 91. The first lower-limit position detector 24 includes detection parts 24a, 24b, and 24c, e.g., line sensors. The detection parts 24a, 24b, and 24c are disposed at predetermined positions at predetermined intervals. For example, the detection part 24a is located so as to detect the first drop lift 21 when the first drop lift 21 is lowered to a switching position from high-speed traveling to low-speed traveling. Similarly, the detection part 24b is located so as to detect the first drop lift 21 when the first drop lift 21 is raised to a switching position from low-speed traveling to ultralow-speed traveling, and the detection part 24c is located so as to detect the first drop lift 21 when the first drop lift 21 is raised to a switching position from ultralow-speed traveling to a stopping state.

The conveyance facility 60 will be described below.

As shown in FIGS. 1 to 3, the conveyance facility 60 conveys the workpieces W dried in the high-temperature zone 92. The conveyance facility 60 is extended along the high-temperature zone 92 in the main unit 6 of the drying booth 3. The conveyance facility 60 receives the workpieces W raised from the first lifting facility 20, at an end position 61 of the high-temperature zone 92. Subsequently, the conveyance facility 60 conveys the received workpieces W along the high-temperature zone 92 while the workpieces W are supported by the workpiece support members 80. The conveyance facility 60 includes the first feeder 62 and a conveyor 67.

The first feeder 62 presses the workpiece support member 80, which supports the workpiece W, from the first drop lift 21 to the conveyor 67 when the workpiece W raised by the first drop lift 21 is received by the conveyor 67. The first feeder 62 is mainly composed of a pusher 63 that presses the workpiece support member 80, a feeder frame 64 that supports the pusher 63, and a cylinder unit 65 that drives the pusher 63. The pusher 63 and the feeder frame 64 are provided in the drying furnace 1 (drying booth 3) and are made up of members having high heat resistance to high temperatures in the high-temperature zone 92. The cylinder unit 65 is provided outside the drying furnace 1 (drying booth 3).

As shown in FIG. 6A, the feeder frame 64 has the fixed guide 66 that comes into contact with the contact part 42 of the locking arm 38.

The conveyor 67 conveys the workpieces W hung from the workpiece support members 80, along the high-temperature zone 92. The conveyor 67 is provided in the drying furnace 1 (drying booth 3) and is made up of members having high heat resistance to high temperatures in the high-temperature zone 92.

The second lifting facility 70 will be described below.

As shown in FIG. 1, the second lifting facility 70 lowers the workpiece W from the high-temperature zone 92 to the carrying-out position 94. The second lifting facility 70 is provided from the high-temperature zone 92 to the carrying-out position 94 in the second wall part 5 of the drying booth 3. The second lifting facility 70 receives the workpiece W, which is conveyed by the conveyor 67, at an other end position 68 of the high-temperature zone 92. Subsequently, the second lifting facility 70 lowers the received workpiece W to the carrying-out position 94 while the workpiece W is hung from the workpiece support member 80. The second lifting facility 70 then delivers the workpiece W to a conveyance facility (not shown) provided outside the drying furnace 1. The second lifting facility 70 includes a second drop lift 71 (an example of "lifting apparatus"), a second strut 76, a second upper-limit position detector 85 (an example of "detector"), and a second lower-limit position detector 77.

The second drop lift 71 lowers the workpiece W hung from the workpiece support member 80, from the high-temperature zone 92 to the carrying-out position 94. The second drop lift 71 is mainly composed of a second support part 72, a second driving part 73, and a second stop apparatus 74.

The second support part 72 and the second driving part 73 are identical in configuration to the first support part 25 and the first driving part 31 of the first drop lift 21.

Figure 8A:
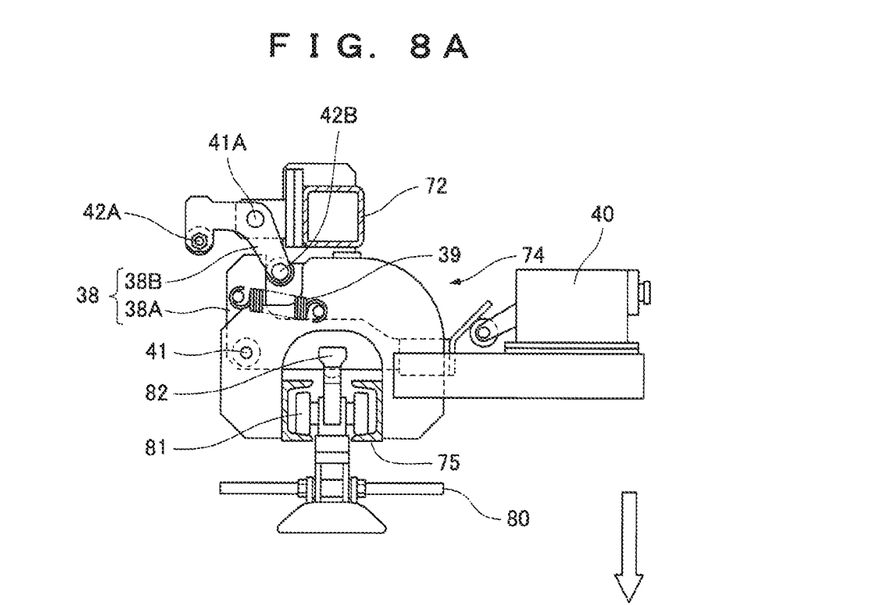
FIG. 8A is a front view of a second stop apparatus when a second drop lift rises to the high-temperature zone.
Figure 8B:
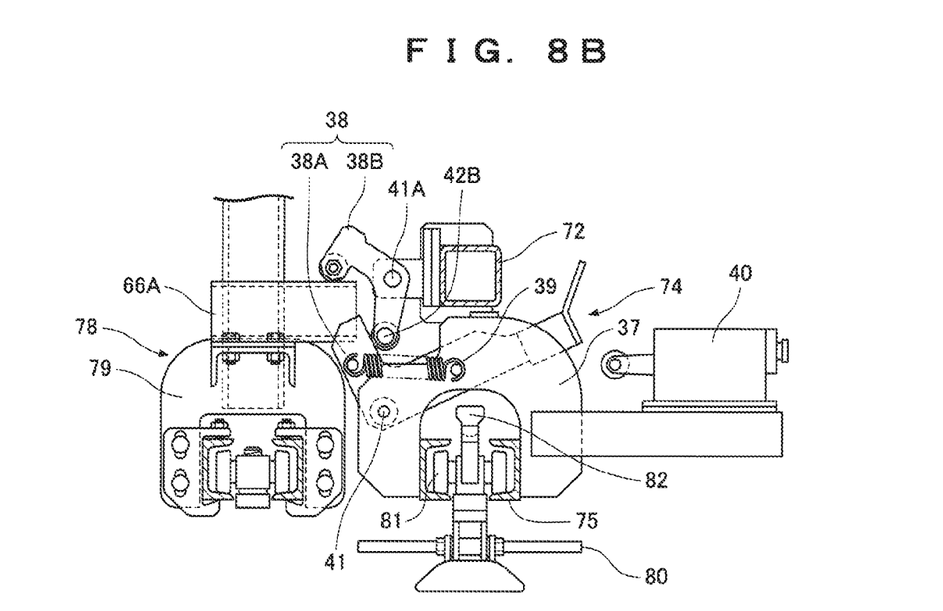
FIG. 8B is a front view of the second stop apparatus when the second drop lift lowers to a carrying-out position.

The second stop apparatus 74 is provided for stopping the workpiece W received from the conveyor 67, at the other end position 68 of the high-temperature zone 92. As shown in FIGS. 8A and 8B, the second stop apparatus 74 is provided on a guide rail 75 of the second support part 72. The second stop apparatus 74 is engaged with the protruding part 82 protruding from the guide rollers 81 of the workpiece support member 80. Thus, the workpiece support member 80 is locked and the workpiece W supported by the workpiece support member 80 is stopped at the other end position 68 of the high-temperature zone 92. The second stop apparatus 74 is mainly composed of a main unit 37, a locking arm 38 (an example of "locking part"), elastic members 39 (an example of "regulating part"), an arm detection switch 40, and a fixed guide 66A (an example of "contact part") provided on a feeder frame 79 of a second feeder 78. The members of the second stop apparatus 74 are made up of members having high heat resistance to high temperatures in the high-temperature zone 92. As in the first stop apparatus 36, in the second stop apparatus 74, a part for locking the workpiece support member 80 includes a mechanical locking mechanism and the locking arm 38 can be operated without using a driving source, e.g., an air cylinder.

The main unit 37 is a main part of the second stop apparatus 74 and is provided perpendicularly to a guide rail 28 of the second support part 72. The main unit 37 partially holds the guide rail 28 of the second support part 72.

The locking arm 38 is a part for locking the workpiece support member 80. The locking arm 38 includes a main unit 38A and an arm 38B.

The main unit 38A is a part engaged with the protruding part 82 on the guide rollers 81 of the workpiece support member 80. The main unit 38A is rotatably supported by a first rotating shaft 41 provided in the main unit 37. A contact part 42 on one end of the main unit 38A comes into contact with the arm 38B and is pressed downward, so that the main unit 38A rotates about the first rotating shaft 41. The other end of the main unit 38A comes into contact with an arm detection switch 40.

The arm 38B is provided for rotating the main unit 38A. The arm 38B is rotatably supported by a second rotating shaft 41A provided at a different position from the first rotating shaft 41 in the main unit 37. A contact part 42A on one end of the arm 38B is pressed downward in contact with the fixed guide 66A, which will be discussed later, rotating the arm 38B about the second rotating shaft 41A. The arm 38B rotates about the second rotating shaft 41A, so that the contact part 42B on the other end of the arm 38B is brought into contact with the contact part 42 on one end of the main unit 38A so as to press the main unit 38A downward.

In this way, the locking arm 38 is mechanically operated when the arm 38B rotated by the contact with the fixed guide 66A comes into contact with the main unit 38A.

The elastic members 39 regulate the rotation of the main unit 38A. The elastic member 39 is provided between the main unit 37 and one end of the main unit 38A. The elastic members 39 regulate the main unit 38A in a direction opposite to the rotation direction (downward direction) of the main unit 38A when coming into contact with the arm 38B. Since the member for regulating the rotation of the main unit 38A is the elastic member 39, the influence of tar or the like generated in the drying furnace 1 is reduced.

At the carrying-out position 94, the second feeder 78 is provided for pulling out the workpiece support member 80, which supports the workpiece W, from the second drop lift 71 to the conveyance facility (not shown) when the workpiece W lowered from the second drop lift 71 is delivered to the conveyance facility provided outside the drying furnace 1. Moreover, the feeder frame 79 of the second feeder 78 includes the fixed guide 66A that comes into contact with the contact part 42A of the arm 38B of the locking arm 38.

The second strut 76, the second upper-limit position detector 85, and the second lower-limit position detector 77 are identical in configuration to the first strut 22, the first upper-limit position detector 23, and the first lower-limit position detector 24, and thus the explanation thereof is omitted.

The operation of the first stop apparatus 36 will be discussed below.

As shown in FIG. 6B, the first stop apparatus 36 holds the locking arm 38 in a horizontal position in order to stop the workpiece support member 80 at the carrying-in position 91 when the first drop lift 21 receives the workpiece W at the carrying-in position 91. Thus, the locking arm 38 can be engaged with the protruding part 82 on the guide rollers 81 of the workpiece support member 80. At this point, the rotation of the locking arm 38 is regulated by the elastic members 39 and thus the locking arm 38 locks the workpiece support member 80 in the horizontal position. Also when the first drop lift 21 raises the workpiece W from the carrying-in position 91 to the high-temperature zone 92, the locking arm 38 is kept in the horizontal position (the locking position of the workpiece support member 80) by the regulation of the elastic members 39.

As shown in FIG. 6A, in the first stop apparatus 36, the contact part 42 on one end of the locking arm 38 is pressed downward in contact with the fixed guide 66 when the first drop lift 21 raises the workpiece W to the high-temperature zone 92. Thus, the locking arm 38 rotates about the first rotating shaft 41 so as to lift the other end of the locking arm 38. This disengages the locking arm 38 from the protruding part 82 on the guide rollers 81 of the workpiece support member 80 (the workpiece support member 80 is unlocked).

In this way, in the first stop apparatus 36, one end of the locking arm 38 is brought into contact with the fixed guide 66 so as to mechanically operate the locking arm 38.

The operation of the second stop apparatus 74 will be discussed below.

As shown in FIG. 8A, the second stop apparatus 74 holds the main unit 38A in a horizontal position in order to stop the workpiece support member 80 at the other end position 68 of the high-temperature zone 92 when the second drop lift 71 receives the workpiece W from the conveyor 67. Thus, the main unit 38A can be engaged with the protruding part 82 on the guide rollers 81 of the workpiece support member 80. At this point, the rotation of the main unit 38A is regulated by the elastic members 39 and thus the main unit 38A locks the workpiece support member 80 in the horizontal position. Also when the second drop lift 71 lowers the workpiece W from the high-temperature zone 92 to the carrying-out position 94, the main unit 38A is kept in the horizontal position (the locking position of the workpiece support member 80) by the regulation of the elastic members 39.

As shown in FIG. 8B, in the second stop apparatus 74, the contact part 42B on one end of the arm 38B is pressed upward in contact with the fixed guide 66, which is provided on the feeder frame 79 of the second feeder 78 disposed at the carrying-out position 94, when the second drop lift 71 lowers the workpiece W to the carrying-out position 94. Thus, the arm 38B rotates about the second rotating shaft 41A so as to press one end of the main unit 38A downward.

The main unit 38A rotates about the first rotating shaft 41 in synchronization with the rotation (press) of the arm 38B. Thus, the other end of the main unit 38A is lifted so as to unlock the workpiece support member 80.

In this way, in the second stop apparatus 74, one end of the arm 38B is brought into contact with the fixed guide 66 so as to mechanically operate the main unit 38A.

The operation of the first upper-limit position detector 23 will be described below. The operation of the second upper-limit position detector 85 is identical to that of the first upper-limit position detector 23 and thus the explanation thereof is omitted.

As shown in FIG. 7, when the first drop lift 21 is raised from the carrying-in position 91 to the high-temperature zone 92, the contact body 29 provided on the first support part 25 (first support member 26) of the first drop lift 21 comes into contact with the lifting part 45 (the lower end of the contact member 47) of the first upper-limit position detector 23. Moreover, when the first drop lift 21 is raised, the contact member 47 is raised by a press of the contact body 29. The upper end of the contact member 47 is then brought into contact with the detection switch 50 of the detection part 49a. This turns on the detection switch 50 of the detection part 49a, allowing detection of the first drop lift 21 raised to the switching position from high-speed traveling to low-speed traveling.

Similarly, when the first drop lift 21 is further raised and the contact member 47 is further pressed by the contact body 29 so as to turn on the detection switch 50 of the detection part 49b, the detection part 49b detects the first drop lift 21 raised to the switching position from low-speed traveling to ultralow-speed traveling. When the detection switch 50 of the detection part 49c is turned on, the detection part 49c detects the first drop lift 21 raised to the switching position from ultralow-speed traveling to a stopping state.

In this way, in the first upper-limit position detector 23, the contact member 47 of the lifting part 45 is raised in contact with the contact body 29 and then the position of the raised contact member 47 is detected so as to indirectly detect the upper limit position of the first drop lift 21.

As has been discussed, according to the present embodiment, the first strut 22 (second strut 76) that supports the first drop lift 21 (second drop lift 71) so as to raise and lower the first drop lift 21 is extended to the high-temperature zone 92 in the drying furnace 1, so that the overall first strut 22 (second strut 76) is covered in the drying furnace 1. This eliminates the need for a slit (clearance) in a part where the first drop lift 21 (second drop lift 71) is moved in the drying booth 3, thereby preventing air in the high-temperature zone 92 of the drying furnace 1 from leaking out of the drying furnace 1 (reducing a heat loss in the drying booth 3) so as to improve the thermal efficiency of the drying furnace 1. Moreover, the first drop lift 21 (second drop lift 71) and the first strut 22 (second strut 76) can be contained in the drying furnace 1, thereby downsizing the main unit of the drying furnace 1. This can reduce the installation space of the drying furnace 1.

According to the present embodiment, the first upper-limit position detector 23 (second upper-limit position detector 85) indirectly detects the upper limit position of the first drop lift 21 (second drop lift 71) through the detection of the position of the lifting part 45 raised and lowered in contact with the first drop lift 21 (second drop lift 71) in the high-temperature zone 92. This eliminates the need for the detection part 49 in the high-temperature zone 92. Thus, the detection part 49 can be configured for room temperature specifications, reducing the cost of the overall system.

According to the present embodiment, the first stop apparatus 36 and the second stop apparatus 74 each include the mechanical locking mechanism, eliminating the need for the starting power of the first stop apparatus and the second stop apparatus 74.

In the present embodiment, the first lifting facility 20 and the second lifting facility 70 raise and lower the workpieces W hung from the workpiece support members 80. The present invention is not limited to this configuration. The first lifting facility 20 and the second lifting facility 70 may raise and lower the workpieces W placed on stages or the like as long as the first strut 22 and the second strut 76 are provided in the drying furnace 1 (drying booth 3).

In the present embodiment, the workpieces W are raised and lowered in two different locations, that is, the first lifting facility 20 and the second lifting facility 70. The present invention is not limited to this configuration. The workpieces W may be raised and lowered in a single lifting facility as long as the strut of the lifting facility is provided in the drying furnace 1 (drying booth 3).

In the present embodiment, the contact body 29 in contact with the contact member 47 of the first upper-limit position detector 23 (second upper-limit position detector 85) is a rod member. The present invention is not limited to this configuration. The contact body 29 may be, for example, a plate member as long as the contact body 29 in contact with the contact member 47 can press the contact member 47 upward when the first drop lift 21 rises. Alternatively, without the contact body 29, the contact member 47 may be directly brought into contact with the first support part 25 (first support member 26) of the first drop lift 21.

In the present embodiment, the contact member 47 of the first upper-limit position detector 23 (second upper-limit position detector 85) is urged downward by the elastic member 48. The present invention is not limited to this configuration. The contact member 47 may be urged downward by a power source, e.g., an air cylinder as long as the contact member 47 is urged downward.

What is claimed is:

1. A lifting facility provided for a workpiece in a drying furnace for drying the workpiece, the lifting facility comprising:
   a lifting apparatus that conveys the workpiece so as to raise and lower the workpiece between one of a carrying-in position where the workpiece is carried in the drying furnace and a carrying-out position where the workpiece is carried out from the drying furnace and a high-temperature zone that is formed above the carrying-in position and the carrying-out position and allows drying of the workpiece;
   a strut that supports the lifting apparatus so as to raise and lower the lifting apparatus; and
   a detector that detects an upper limit position of the lifting apparatus, wherein
   the strut is extended to the high-temperature zone in the drying furnace, and
   the detector comprises a lifting part that is raised or lowered when one end of the lifting part comes into contact with the lifting apparatus in the high-temperature zone and a detection part that detects a position of another end of the raised or lowered lifting part outside the drying furnace.

2. A lifting facility provided for a workpiece in a drying furnace for drying the workpiece, the lifting facility comprising
   a lifting apparatus that conveys the workpiece so as to raise and lower the workpiece between one of a carrying-in position where the workpiece is carried in the drying furnace and a carrying-out position where the workpiece is carried out from the drying furnace and a high-temperature zone that is formed above the carrying-in position and the carrying-out position and allows drying of the workpiece; and
   a strut that supports the lifting apparatus so as to raise and lower the lifting apparatus, the strut being extended to the high-temperature zone in the drying furnace, wherein
   the workpiece is carried to the carrying-in position while being supported by a workpiece support member,
   the lifting apparatus includes a first stop apparatus that stops the workpiece at the carrying-in position, and
   the first apparatus includes:
   a locking part that locks the workpiece support member;
   a contact part that comes into contact with the locking part and operates the locking part so as to unlock the workpiece support member locked by the locking part; and
   a regulating part that regulates the operation of the locking part, so as to operate the workpiece support member in the high-temperature zone.

3. A conveyance system provided for a workpiece in a drying furnace for drying the workpiece, the conveyance system comprising:
   a first lifting facility that is formed above a carrying-in position where the workpiece is carried in the drying furnace, the first lifting facility raising the workpiece to a high-temperature zone for drying the workpiece;
   a conveyance facility that conveys, in the high-temperature zone, the workpiece raised by the first lifting facility; and
   a second lifting facility that lowers the workpiece conveyed by the conveyance facility, to a carrying-out position where the workpiece is carried out from the drying furnace,
   wherein each of the first lifting facility and the second lifting facility includes:
   a lifting apparatus that raises and lowers the workpiece; and
   a strut that supports the lifting apparatus so as to raise and lower the workpiece, the strut being extended to the high-temperature zone in the drying furnace; and
   a detector that detects an upper limit position of the lifting apparatus, the detector comprising a lifting part that is raised or lowered when one end of the lifting part comes into contact with the lifting apparatus in the high-temperature zone and a detection part that detects a position of another end of the raised or lowered lifting part outside the drying furnace.

4. A conveyance system provided for a workpiece in a drying furnace for drying the workpiece, the conveyance system comprising:
   a first lifting facility that is formed above a carrying-in position where the workpiece is carried in the drying furnace, the first lifting facility raising the workpiece to a high-temperature zone for drying the workpiece;
   a conveyance facility that conveys, in the high-temperature zone, the workpiece raised by the first lifting facility; and
   a second lifting facility that lowers the workpiece conveyed by the conveyance facility, to a carrying-out position where the workpiece is carried out from the drying furnace, wherein
   each of the first lifting facility and the second lifting facility includes a lifting apparatus that raises and lowers the workpiece and a strut that supports the lifting apparatus so as to raise and lower the workpiece, the strut being extended to the high-temperature zone in the drying furnace, the workpiece is carried to the carrying-in position while being supported by the workpiece support member, the lifting apparatus of the first lifting facility includes a first stop apparatus that stops the workpiece at the carrying-in position, and the first stop apparatus includes a locking part that locks the workpiece support member, a contact part that comes into contact with the locking part and operates the locking part so as to unlock the workpiece support member locked by the locking part and a regulating part that regulates the operation of the locking part, so as to operate the workpiece support member in the high-temperature zone.

* * * * *